US012154535B2

(12) United States Patent
Schulze

(10) Patent No.: US 12,154,535 B2
(45) Date of Patent: Nov. 26, 2024

(54) HANDHELD MUSICAL INSTRUMENT WITH GESTURE CONTROL

(71) Applicant: Arne Schulze, Reno, NV (US)

(72) Inventor: Arne Schulze, Reno, NV (US)

( * ) Notice: Subject to any disclaimer, the term of this patent is extended or adjusted under 35 U.S.C. 154(b) by 0 days.

(21) Appl. No.: 18/075,074

(22) Filed: Dec. 5, 2022

(65) Prior Publication Data

US 2023/0178059 A1 Jun. 8, 2023

Related U.S. Application Data

(63) Continuation-in-part of application No. 18/074,421, filed on Dec. 2, 2022, now Pat. No. 11,893,969.

(60) Provisional application No. 63/286,105, filed on Dec. 6, 2021.

(51) Int. Cl.

| | |
|---|---|
| ***G10H 1/34*** | (2006.01) |
| ***G10H 1/00*** | (2006.01) |
| ***G10H 3/00*** | (2006.01) |

(52) U.S. Cl.

CPC ............. *G10H 3/00* (2013.01); *G10H 1/0041* (2013.01); *G10H 1/34* (2013.01); *G10H 2210/391* (2013.01); *G10H 2220/251* (2013.01); *G10H 2220/395* (2013.01); *G10H 2230/281* (2013.01)

(58) Field of Classification Search

CPC ........... G10H 1/0008; G10H 2220/395; G10H 1/0025; G10H 2240/056; G10H 1/40; G10H 2220/135; G10H 2240/145; G10H 2210/076; G10H 1/00; G10H 1/26; G10H 2210/381; G10H 1/42; G10H 2220/391; G10H 2220/201; G10H 2220/206; G10H 2210/391; G10H 3/146; G10H 1/18; G10H 2210/105; G10H 2210/155; G10H 2210/385; G10H 2210/375; G10H 3/143; G10H 2210/071; G10H 2220/155; G10H 2210/101; G10H 2220/525; G10H 1/0556; A63H 5/00

See application file for complete search history.

(56) References Cited

U.S. PATENT DOCUMENTS

| | | | | |
|---|---|---|---|---|
| 5,177,311 A * | 1/1993 | Suzuki | ..................... | G10H 1/34 84/DIG. 12 |
| 5,585,584 A * | 12/1996 | Usa | .......................... | G10H 1/00 84/723 |
| 8,111,241 B2 | 2/2012 | Weinberg et al. | | |
| 9,761,209 B2 | 9/2017 | Cook et al. | | |

(Continued)

FOREIGN PATENT DOCUMENTS

| | | | | |
|---|---|---|---|---|
| GB | 2555589 A * | 5/2018 | ............. | G06F 1/163 |
| JP | 3867515 B2 * | 1/2007 | ........... | G10H 1/0008 |

(Continued)

*Primary Examiner* — Marlon T Fletcher

(57) ABSTRACT

A handheld musical instrument for playing a variety of audio program, the handheld musical instrument includes a main body portion with one or more sensors, a handle portion engaged with said main body portion, wherein said handle portion includes one or more control buttons to select a type of program to be played by said handheld musical instrument and a gesture detection module for detecting gestures associated with said handheld musical instrument and controlling a tempo associated with said program played by said handheld musical instrument based on said detected gestures.

15 Claims, 5 Drawing Sheets

(56) References Cited

U.S. PATENT DOCUMENTS

| | | | | |
|---|---|---|---|---|
| 2001/0015123 | A1* | 8/2001 | Nishitani | G10H 1/00 84/615 |
| 2004/0000225 | A1* | 1/2004 | Nishitani | G10H 1/0083 84/610 |
| 2008/0156178 | A1* | 7/2008 | Georges | G10H 1/365 84/645 |
| 2009/0091543 | A1 | 4/2009 | Camp, Jr. et al. | |
| 2015/0268921 | A1* | 9/2015 | Georges | G10H 1/38 700/94 |
| 2018/0188850 | A1* | 7/2018 | Heath | G06F 3/0202 |
| 2022/0189335 | A1* | 6/2022 | Ruffner | G10H 1/0008 |
| 2023/0178059 | A1* | 6/2023 | Schulze | G10H 3/00 84/612 |

FOREIGN PATENT DOCUMENTS

| | | | | |
|---|---|---|---|---|
| WO | WO-02091352 | A2 * | 11/2002 | G10H 1/0058 |
| WO | WO-2013159144 | A1 * | 10/2013 | A45F 5/00 |

* cited by examiner

HANDHELD MUSICAL INSTRUMENT WITH GESTURE CONTROL

CROSS-REFERENCE TO RELATED APPLICATIONS

The present Continuation-in-part patent application claims priority benefit under 35 U.S.C 120 of the nonprovisional patent application Ser. No. 18/074,421 entitled “A Handheld musical Instrument” filed on 2022 Dec. 2, which further claims priority of U.S. provisional application for patent Ser. No. 63/286,105, titled, “Handheld Electronic Percussion Instrument”, filed on 2021 Dec. 6 Under 35 U.S.C. 119(e). The contents of these related patent application(s) are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to handheld electronic percussion instruments. More particularly, certain embodiments of the invention relate to gesture controlling a tempo associated with the handheld electronic percussion instrument.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Electronic percussion instruments mimic traditional acoustic drum kits with electronic triggers corresponding to the various drums and cymbals of an acoustic kit. Striking a pad triggers a drum machine to play a percussion sound or sounds assigned to the pad or pads. A percussionist plays these types of electronic percussion instruments with sticks in the same way that an acoustic drum kit would be played. Further, during a live musical performance, a supplementing percussion, such as, without limitation, a MIDI (Musical Instrument Digital Interface) sequencer needs to be synchronized with the live performance.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a MIDI compatible sequencer listens and detects the output of a live drummer’s kick or snare drum’s audio channel and derives a tempo in real time to generate a MIDI time code to synchronize the MIDI sequence with a live performance. Any abrupt deviation in tempo may cause a disturbance in synchronizing the MIDI sequence.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
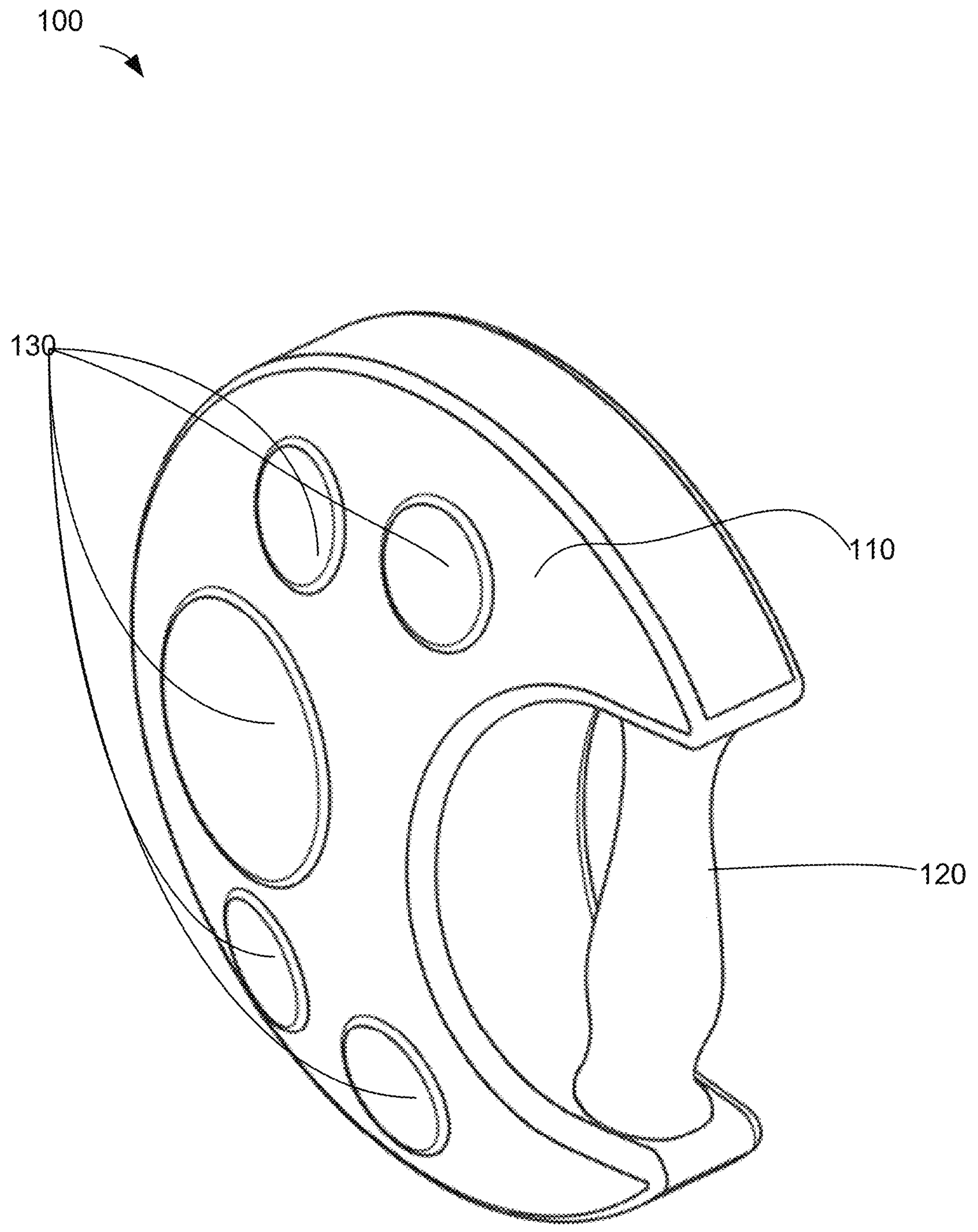
FIG. 1 illustrates a handheld electronic musical instrument, in accordance with some embodiments of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially" ] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term “substantially” in a patent claim. Also see Epcon, 279 F.3d at 1031 (“The phrase ‘substantially constant’ denotes language of approximation, while the phrase ‘substantially below’ signifies language of magnitude, i.e., not insubstantial.”). Also, see, e.g., Epcon Gas Sys., Inc. v. Bauer Compressors, Inc., 279 F.3d 1022 (Fed. Cir. 2002) (construing the terms “substantially constant” and “substantially below”); Zodiac Pool Care, Inc. v. Hoffinger Indus., Inc., 206 F.3d 1408 (Fed. Cir. 2000) (construing the term “substantially inward”); York Prods., Inc. v. Cent. Tractor Farm & Family Ctr., 99 F.3d 1568 (Fed. Cir. 1996) (construing the term “substantially the entire height thereof”); Tex. Instruments Inc. v. Cypress Semiconductor Corp., 90 F.3d 1558 (Fed. Cir. 1996) (construing the term “substantially in the common plane”). In conducting their analysis, the court instructed to begin with the ordinary meaning of the claim terms to one of ordinary skill in the art. Prima Tek, 318 F.3d at 1148. Reference to dictionaries and our cases indicates that the term “substantially” has numerous ordinary meanings. As the district court stated, “substantially” can mean “significantly” or “considerably.” The term “substantially” can also mean “largely” or “essentially.” Webster’s New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase “up to about 10%” includes the “about 10%” endpoint. As pointed out by AK Steel, when an object of the preposition “up to” is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—“about 10%”—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states “It is well established that when the term “substantially” serves reasonably to describe the subject matter so that its scope would be understood by persons in the field of the invention, and to distinguish the claimed subject matter from the prior art, it is not indefinite.” Likewise see Verve LLC v. Crane Cams Inc., 311 F.3d 1116, 65 USPQ2d 1051, 1054 (Fed. Cir. 2002). Expressions such as “substantially” are used in patent documents when warranted by the nature of the invention, in order to accommodate the minor variations that may be appropriate to secure the invention. Such usage may well satisfy the charge to “particularly point out and distinctly claim” the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as “substantially equal” and “closely approximate” may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that “like the term ‘about,’ the term ‘substantially’ is a descriptive term commonly used in patent claims to ‘avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term “substantially” to modify the term “uniform” does not render this phrase so unclear such that there is no means by which to ascertain the claim scope.

Similarly, other courts have noted that like the term “about,” the term “substantially” is a descriptive term commonly used in patent claims to “avoid a strict numerical boundary to the specified parameter.”; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as “approach each other,” “close to,” “substantially equal,” and “closely approximate” are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, “substantially” avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said “the claims specify that the film is “substantially” eliminated and for the intended purpose, it is believed that the slight portion of the film which may remain is negligible. We are of the view, therefore, that the claims may be regarded as sufficiently accurate.” Similarly, In re Hutchison, 104 F.2d 829, 42 USPQ 90, 93 (C.C.P.A. 1939) the court said, “It is realized that “substantial distance” is a relative and somewhat indefinite term, or phrase, but terms and phrases of this character are not uncommon in patents in cases where, according to the art involved, the meaning can be determined with reasonable clearness.”

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C . . . sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s). Furthermore, any statement(s), identification(s), or reference(s) to a structure(s) and/or element(s) that corresponds to and/or supports a claim limitation(s) phrased in functional limitation terms covered by 35 USC § 112(6) (post AIA 112(f)) should be understood to be identified by way of example and not limitation, and as such, should not be interpreted to mean that such recited structure and/or element is/are the only structure(s) and/or element(s) disclosed in this patent application that corresponds to and/or supports such claim limitations phrased in functional limitation terms. This claims interpretation intention also applies to any such subsequent statements made by Applicant during prosecution.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

While embodiments herein may be discussed in terms of a processor having a certain number of bit instructions/data, those skilled in the art will know others that may be suitable such as 16 bits, 32 bits, 64 bits, 128s or 256-bit processors or processing, which can usually alternatively be used. Where a specified logical sense is used, the opposite logical sense is also intended to be encompassed.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (TR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards, or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as “processing,” “computing,” “calculating,” “determining,” or the like, refer to the action and/or processes of a computer or computing system, or similar electronic computing device, that manipulate and/or transform data represented as physical, such as electronic, quantities within the computing system’s registers and/or memories into other data similarly represented as physical quantities within the computing system’s memories, registers or other such information storage, transmission or display devices.

Additionally, the phrase “configured to” or “operable for” can include generic structure (e.g., generic circuitry) that is manipulated by software and/or firmware (e.g., an FPGA or a general-purpose processor executing software) to operate in a manner that is capable of performing the task(s) at issue. “Configured to” may also include adapting a manufacturing process (e.g., a semiconductor fabrication facility) to fabricate devices (e.g., integrated circuits) that are adapted to implement or perform one or more tasks.

In a similar manner, the term “processor” may refer to any device or portion of a device that processes electronic data from registers and/or memory to transform that electronic data into other electronic data that may be stored in registers and/or memory. A “computing platform” may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor-based memory, phase change memory, optical memory, periodically refreshed memory, and the like; the non-transitory computer readable medium, however, does not include a pure transitory signal per se; i.e., where the medium itself is transitory.

Embodiments of the present invention disclose a handheld electronic musical instrument, such as, without limitations, a percussion instrument. The handheld electronic musical instrument comprises a body part and a handle part. The handle part may be connected to the body part by various ways as discussed in detail in the parent application Ser. No. 18,074,421, which is incorporated completely herein by reference per above. The body part comprises a set of pads, for example, without limitations, rubber pads. The rubber pads are attached to pressure sensitive sensors, such as, without limitations, a piezoelectric sensor. When a user of the handheld percussion instruments strikes the rubber pads by finger or by hand the piezoelectric sensor is triggered and generates sound files for example, without limitations, digital drum sound files. The handle part of the handheld electronic percussion instrument comprises buttons enabling the user to select different program styles, such as, without limitation, a drum and percussion style program, a Musical Instrument Digital Interface (MIDI) percussion or musical sequences. Further, the handheld electronic musical instrument comprises controlling the tempo of the selected program style based on detecting a gesture information from hand movement of a user of the handheld electronic musical instrument. For example, without limitations, an accelerometer, or a mechanical means may be implemented for gesture detection. For example, without limitations, the mechanical means may include a small metal or plastic ball attached to one end of a thin flexible arm, with the opposite end of the arm fastened to the handheld electronic musical instrument, wherein with a back and forth gesture the thin flexible arm would sway back and forth to hit and trigger opposite side sensors generating a MIDI clock tempo. The MIDI clock tempo generated is based on the pulse speed generated by the gesture. In another example, a small plastic or metal ball may be placed inside a small tube fastened to the handheld electronic musical instrument, such that with a back and forth gesture the ball would travel back and forth allowing it to hit and trigger opposite side sensors generating a MIDI clock tempo with a speed generated by the gesture. The percussion sound obtained by striking the sensor pads combined with gesture detection obtained by the movement of the handheld musical instrument provides a continuous MIDI clock, for example, without limitations, a time code enabling manual control of the tempo of audio output from the instrument such as, without limitations, preprogrammed musical or percussion audio sequence files, or MIDI sequence files. For example, without limitations if the detected gesture is a slow shaky movement, the playback tempo is made slow and on the other hand when the shake is fast then the playback tempo is made faster. The sounds may be amplified and broadcast through loudspeakers controllers connected to an internal sound module of the musical instrument. The loudspeakers controller may be wired or wirelessly connected to the internal sound module. For example, without limitations, the music performance from the handheld musical instrument may be converted to MIDI, and be transmitted wirelessly to an external MIDI sound module, a drum machine, or a computer, and may be amplified and broadcast through loudspeakers controllers or recorded to a storage medium such as, without limitations, a computer.

Regarding the term “time code” (alternatively “time-code”) as may be used herein, uncles stated otherwise, a “time code” is generally an invisible digital address that may be recorded along with an audio or video file for viable synchronization purposes. In the context of the present invention, there is contemplated a distinction between a general "time code" and a "MIDI time code" and "MIDI clock being tempo dependent". That is, typically, MIDI clock events are sent at a rate of 24 pulses per quarter note. Those events are used to control and maintain a tempo for BPM-dependent e.g., without limitation, MIDI sequence files. In at least some embodiments described herein, the term MIDI Clock/code should be understood as a MIDI clock/code that is at least in part tempo dependent thereby facilitating a user's Gesture to a MIDI tempo dependent time code/clock as employed in at least some embodiments of the present invention.

FIG. 1 illustrates a handheld electronic musical instrument 100. FIG. 1 illustrates a front view of instrument 100. Instrument 100 includes a body part 110 and a handle part 120. Body part 110 and the handle part 120 may be connected in different ways and is discussed in detail in the parent application Ser. No. 18,074,421 which is incorporated completely herein by reference per above. Body part 110 includes one or more sensor pads 130. Sensor pads 130 are for example, without limitation, piezoelectric sensor pads. Each piezoelectric sensor pad comprises a rubber pad, a metal plate, a piezoelectric sensor, and a foam layer. Striking one or more sensor pads 130 produces a percussion sound. Instrument 100 also enables the user to select different program styles using a button, such as, without limitations, a thumb button, a push button, or a joystick. The buttons may be associated with handle 120 of instrument 100. Different program styles include, such as, without limitation, a drum and percussion style program, a Musical Instrument Digital Interface (MIDI) percussion or musical sequences. Further, instrument 100 comprises controlling the tempo of the selected program style based on detecting a gesture information from a user of the handheld electronic musical instrument, wherein the gesture information is associated with a hand movement of the user. For example, without limitation, gesture information includes a fast or a slow shaking of instrument 100 and controlling the tempo includes increasing the tempo for a fast shake and decreasing the tempo for a slow shake.

Figure 2:
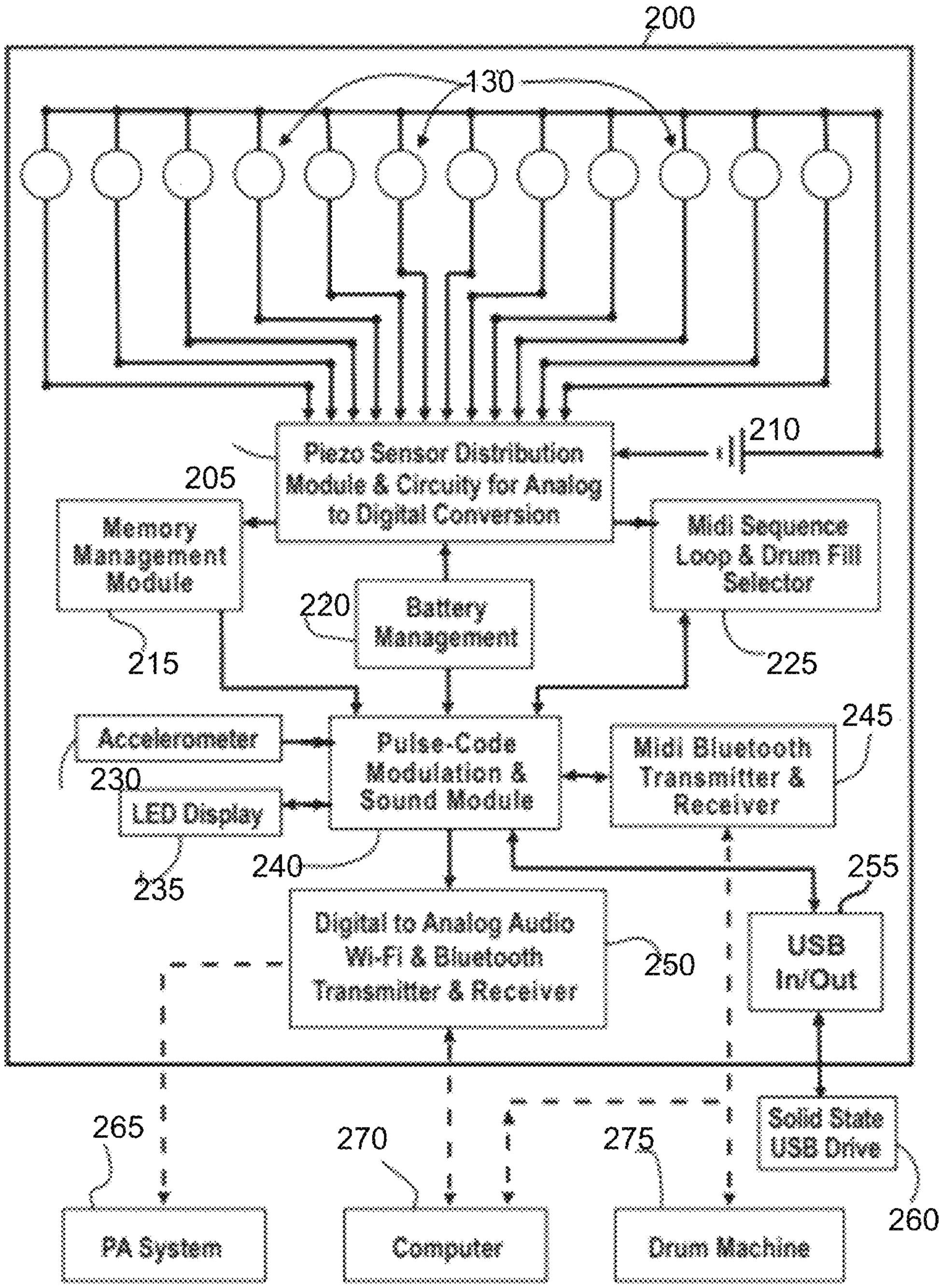
FIG. 2 illustrates a schematic of a handheld electronic musical instrument for tempo control, in accordance with some embodiments of the present invention.

FIG. 2 illustrates a schematic of a handheld electronic musical instrument for tempo control, in accordance with some embodiments of the present invention. In FIG. 2 a schematic block diagram 200 of instrument 100 is shown. the various blocks of instrument 100 includes, such as, without limitations, a piezo sensor distribution module and circuitry 205 connected to a common ground 210, a memory management module 215, a battery management module 220, a MIDI sequence loop & drum fill selector 225, an accelerometer 230, a pulse-code modulation & sound module 240, a MIDI Bluetooth transmitter & receiver module 245, a display 235, a digital to analog audio wi-fi & Bluetooth transmitter 250, a USB in/out connector 255, a solid-state USB drive 260, a public address system (PA system) 265, an external drum machine 275, and or a computer 270.

In FIG. 2, piezoelectric sensor pads 130 are connected to piezoelectric sensor distribution module and circuitry 205. Sensor pads 130 are triggered by the hand or finger tapping of the user. The trigger from sensor pads 130 are individually wired to piezoelectric sensor distribution module and circuitry 205 for analog to digital signal conversion. Sensor pads 130 are connected to a common ground 210. Midi Sequence Loop & Drum Fill Selector 225 includes a set of preprogrammed MIDI sequences, for example, without limitations, hi hat, shakers, ride cymbals, cowbell, the play back tempo of the MIDI sequences is controlled based on accelerometer 230 identified MIDI Clock tempo. For example, without limitations, accelerometer 230 detects a movement of the handheld instrument 100 and converts the detected movement to a preferable readable MIDI clock (time code), and the MIDI clock is applied to control the tempo of the preprogrammed musical MIDI or percussion sequence files, wherein the sequences are obtained by means of a finger or hand, tapping assigned sensor pads 130, by using Joystick 160, or finger and thumb sensors of handle 120. Each individual sequence may be represented in any suitable format depending upon the needs of the application; however, in the present embodiment, individual sequence may be represented as a MIDI file playing PCM (Pulse-Code Modulation) digital audio files that may be stored in Sound Module 240, of a computer 270, or external drum machine 275. In some embodiment, the individual sequence may (e.g., a MIDI file) may instead or also be transmitted wirelessly. In the present embodiment, a standard MIDI file (SMF) is a file format that provides a standardized way for music sequences to be saved, transported, and opened in other systems. Generally, as is well known to those skilled in the art, SMFs do not contain actual audio data as do regular audio files such as MP3s or WAVs. In contrast, SMFs instead explain what notes are played, when they're played, and how long or loud each note should be. Files in this format are basically instructions that explain how the sound should be produced once attached to a playback device or loaded into a particular software program that knows how to interpret the data. SMF playback tempo is typically controlled by a variable MIDI clock (tempo dependent time code) setting identified by BPM (Beats Per Minute). The time code typically may also include a digital time code.

Accelerometer 230 detecting gestures to generate time code and controlling the tempo associated with MIDI sequences from Midi Sequence Loop & Drum Fill Selector 225 may collectively be called a MIDI Sequence storage module. MIDI Bluetooth transmitter & receiver 245 transmits MIDI information, such as, without limitations, individual MIDI notes, MIDI Clock Tempo, and MIDI Sequences directly to an external drum machine 275 or a computer 270. Further, Digital to Analog Audio Wi-Fi & Bluetooth transmitter 250 transmits the audio performance from instrument 100 to PA System 265 such as, without limitations, loudspeaker. USB In/Out connector 255 may connect to computer 270 or storage device (not shown) through solid state USB drive 260 for loading and saving PCM data during a data transfer.

Display 235 may be used to display for example, without limitations, the selected preset programs, sensor and button assignments, library sequences from MIDI sequence loop and drum fill selector 225, functions of memory management module 215, setup and status of Wi-Fi and Bluetooth transmitter 250, setup and status of MIDI Bluetooth transmitter 245, functions of USB In/Out port 255, a charging status of battery management module 220, MIDI Clock Tempo by BPM (Beats Per Minute) values from accelerometer 230 and a BPM setting for Manual auditioning loaded sequences.

Figure 3:
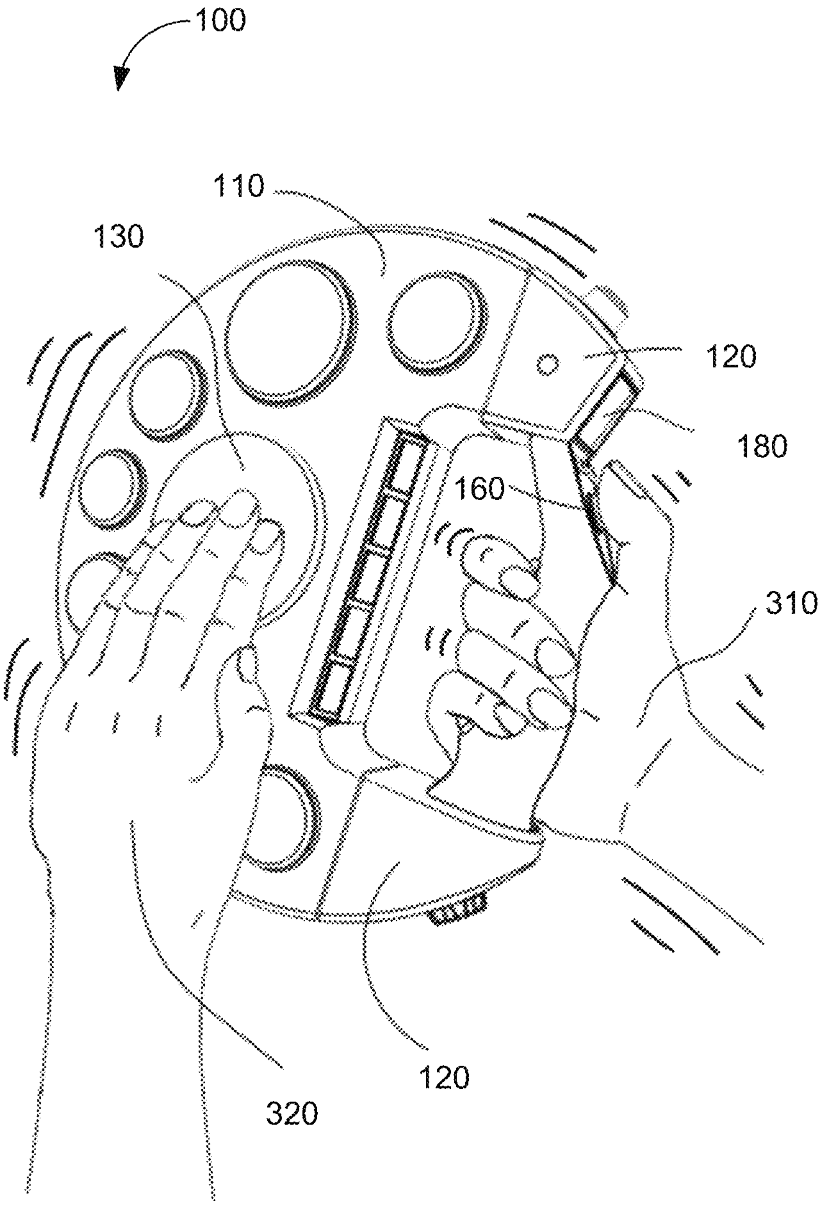
FIG. 3 illustrates moving the handheld electronic musical instrument for a desired tempo while triggering percussion sounds, in accordance with some embodiments of the present invention.

In some embodiments, gesture detection is performed through mechanical means. For example, without limitations, the mechanical means may include a small metal or plastic ball attached to one end of a thin flexible arm, with the opposite end of the arm fastened to the handheld electronic musical instrument, wherein with a back and forth gesture the thin flexible arm would sway back and forth to hit and trigger opposite side sensors generating a MIDI clock tempo. The MIDI clock tempo generated is based on the pulse speed generated by the gesture. In another example, a small plastic or metal ball may be placed inside a small tube fastened to the handheld electronic musical instrument, such that with a back and forth gesture the ball would travel back and forth allowing it to hit and trigger opposite side sensors generating a MIDI clock tempo with a speed generated by the gesture. FIG. 3 illustrates moving the handheld electronic musical instrument for a desired tempo while triggering percussion sounds, in accordance with some embodiments of the present invention. FIG. 3, shows an example of a user moving the instrument 100 while tapping the sensor pads 130. Instrument 100 includes a body 110 and handle 120, wherein the body 120 includes sensor pads 130. Handle 120 includes a thumb operable joystick button 160 and a display 180. Joystick button 160 enables selecting different program styles include, such as, without limitation, a drum and percussion style program, a MIDI percussion or musical sequences changing the audio program settings. Display includes a LED (light emitting diode) or a LCD (liquid crystal display) display. The selected program may be displayed on display 180. In an example operation, the user of the instrument holds the handle 120 with a right hand 310 and selects a program using joystick button 160. The user taps the sensor pad 130 using a left hand 320. Apart from the hold and tap action, the user also provides gesture by moving instrument 100 back and forth, thereby controlling the tempo of percussion sounds produced by tapping the sensor pad 130 based on the gestures. When the back-and-forth movement is fast then tempo of percussion sound is increased, on the other hand when back-and-forth movement is slow the tempo is decreased. The tempo of instrument 100 may be modified based on different types of gestures, for example, without limitations, shaking of the instrument 100 side to side, back-and-forth movement or twisting the instrument 100 similar to shaking of a tambourine.

Figure 4:
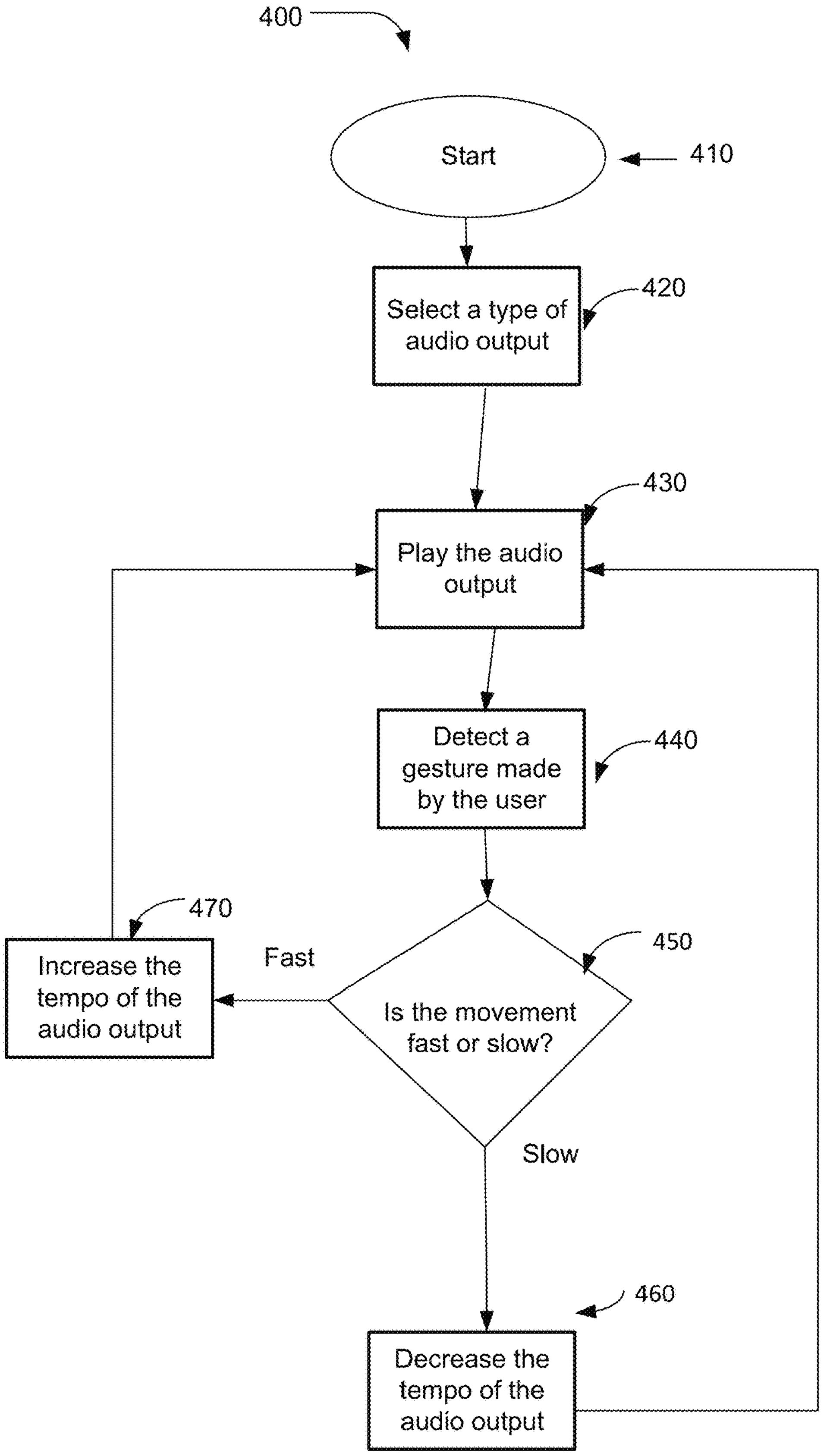
FIG. 4 illustrates a method for changing the tempo of an audio output from a handheld electronic musical instrument, in accordance with an embodiment of the present invention; and, FIG. 5 is a block diagram depicting an exemplary client/server system which may be used by an exemplary web-enabled/networked embodiment of the present invention.

FIG. 4 illustrates a method for changing the tempo of an audio output from a handheld electronic musical instrument, in accordance with an embodiment of the present invention. In FIG. 4 a flow chart describes method 400 for changing the tempo of the audio output from the handheld electronic musical instrument 100. At initial step 410 instrument 100 is prepared for playing different musical sounds. At step 420 a user selects a type of audio to be output or played by instrument 100. The audio output to be played includes such as, without limitation, a drum and percussion style program, a MIDI percussion, or musical sequences. At step 430 the selected audio output is played. At step 440 a gesture is detected based on a movement made by the user of instrument 100. For example, an accelerometer 230 as shown in FIG. 2 or other mechanical means may be used to detect the movement. Gestures include, for example, without limitations, shaking of the instrument 100 side to side, back-and-forth movement or twisting the instrument 100 like shaking of a tambourine. At step 450 a determination is made if the movement created by the user's gesture is fast movement or a slow movement. If the detected movement is fast movement, the tempo of the audio output is increased at step 470 and continued to play with the increased tempo. On the other hand, if the detected movement is slow movement, the tempo of the audio output is decreased at step 460 and continued to play with the reduced tempo. The audio signal output may be wireless and may be compatible with Bluetooth or Wi-Fi GHz 24 standards.

Gesture detection enables handheld electronic musical instrument to play live music while simultaneously controlling in real time the tempo of supplementing active MIDI sequences, such as, without limitations, hi hat, shakers, ride cymbals, cowbell in synchronization with the live performance and provides the ability to physically move freely during an onstage performance.

Figure 5:
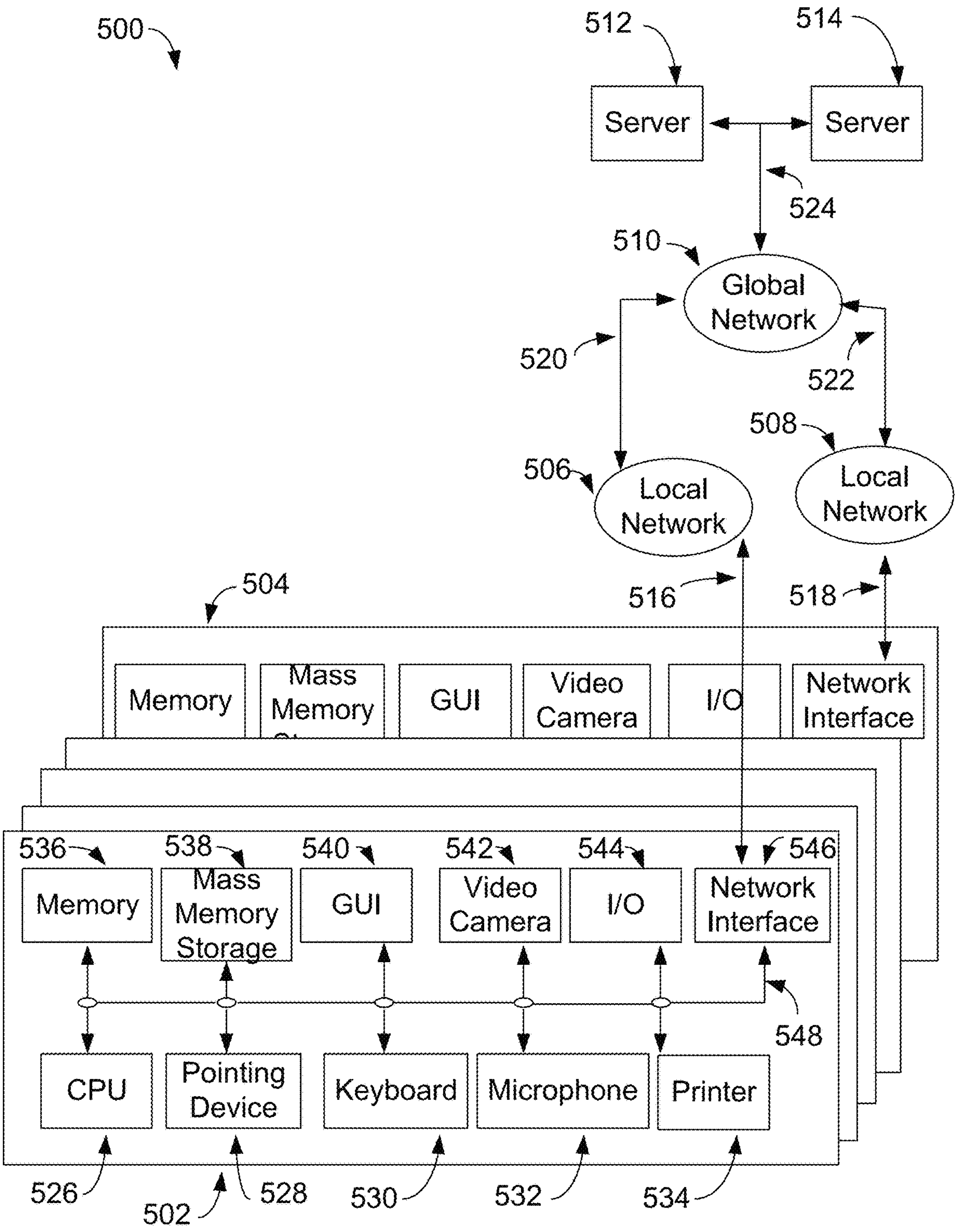

FIG. 5 is a block diagram depicting an exemplary client/server system which may be used by an exemplary web-enabled/networked embodiment of the present invention.

A communication system 500 includes a multiplicity of clients with a sampling of clients denoted as a client 502 and a client 504, a multiplicity of local networks with a sampling of networks denoted as a local network 506 and a local network 508, a global network 510 and a multiplicity of servers with a sampling of servers denoted as a server 512 and a server 514.

Client 502 may communicate bi-directionally with local network 506 via a communication channel 516. Client 504 may communicate bi-directionally with local network 508 via a communication channel 518. Local network 506 may communicate bi-directionally with global network 510 via a communication channel 520. Local network 508 may communicate bi-directionally with global network 510 via a communication channel 522. Global network 510 may communicate bi-directionally with server 512 and server 514 via a communication channel 524. Server 512 and server 514 may communicate bi-directionally with each other via communication channel 524. Furthermore, clients 502, 504, local networks 506, 508, global network 510 and servers 512, 514 may each communicate bi-directionally with each other.

In one embodiment, global network 510 may operate as the Internet. It will be understood by those skilled in the art that communication system 500 may take many different forms. Non-limiting examples of forms for communication system 500 include local area networks (LANs), wide area networks (WANs), wired telephone networks, wireless networks, or any other network supporting data communication between respective entities.

Clients 502 and 504 may take many different forms. Non-limiting examples of clients 502 and 504 include personal computers, personal digital assistants (PDAs), cellular phones and smartphones.

Client 502 includes a CPU 526, a pointing device 528, a keyboard 530, a microphone 532, a printer 534, a memory 536, a mass memory storage 538, a GUI 540, a video camera 542, an input/output interface 544 and a network interface 546.

CPU 526, pointing device 528, keyboard 530, microphone 532, printer 534, memory 536, mass memory storage 538, GUI 540, video camera 542, input/output interface 544 and network interface 546 may communicate in a unidirectional manner or a bi-directional manner with each other via a communication channel 548. Communication channel 548 may be configured as a single communication channel or a multiplicity of communication channels.

CPU 526 may be comprised of a single processor or multiple processors. CPU 526 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 536 is used typically to transfer data and instructions to CPU 526 in a bi-directional manner. Memory 536, as discussed previously, may include any suitable computer-readable media, intended for data storage, such as those described above excluding any wired or wireless transmissions unless specifically noted. Mass memory storage 538 may also be coupled bi-directionally to CPU 526 and provides additional data storage capacity and may include any of the computer-readable media described above. Mass memory storage 538 may be used to store programs, data and the like and is typically a secondary storage medium such as a hard disk. It will be appreciated that the information retained within mass memory storage 538, may, in appropriate cases, be incorporated in standard fashion as part of memory 536 as virtual memory.

CPU 526 may be coupled to GUI 540. GUI 540 enables a user to view the operation of computer operating system and software. CPU 526 may be coupled to pointing device 528. Non-limiting examples of pointing device 528 include computer mouse, trackball, and touchpad. Pointing device 528 enables a user with the capability to maneuver a computer cursor about the viewing area of GUI 540 and select areas or features in the viewing area of GUI 540. CPU 526 may be coupled to keyboard 530. Keyboard 530 enables a user with the capability to input alphanumeric textual information to CPU 526. CPU 526 may be coupled to microphone 532. Microphone 532 enables audio produced by a user to be recorded, processed, and communicated by CPU 526. CPU 526 may be connected to printer 534. Printer 534 enables a user with the capability to print information to a sheet of paper. CPU 526 may be connected to video camera 542. Video camera 542 enables video produced or captured by user to be recorded, processed, and communicated by CPU 526.

CPU 526 may also be coupled to input/output interface 544 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 526 optionally may be coupled to network interface 546 which enables communication with an external device such as a database or a computer or telecommunications or internet network using an external connection shown generally as communication channel 516, which may be implemented as a hardwired or wireless communications link using suitable conventional technologies. With such a connection, CPU 526 might receive information from the network, or might output information to a network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either general purpose, or some specific purpose computer such as, but not limited to, a workstation, a mainframe, GPU, ASIC, etc. The programs may be written in C, or Java, Brew, or any other suitable programming language. The programs may be resident on a storage medium, e.g., magnetic, or optical, e.g., without limitation, the computer hard drive, a removable disk, or media such as, without limitation, a memory stick or SD media, or other removable medium. The programs may also be run over a network, for example, with a server or other machine sending signals to the local machine, which allows the local machine to carry out the operations described herein.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant (s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing gesture control of a tempo associated with the handheld electronic percussion instrument according to the present invention will be apparent to those skilled in the art. Various aspects of the invention have been described above by way of illustration, and the specific embodiments disclosed are not intended to limit the invention to the particular forms disclosed. The particular implementation of the gesture control of a tempo associated with the handheld electronic percussion instrument may vary depending upon the particular context or application. By way of example, and not limitation, the gesture control of a tempo associated with the handheld electronic percussion instrument described in the foregoing were principally directed to controlling a tempo of MIDI sequences during a live performance implementations; however, similar techniques may instead be applied to real time tempo control for a lightweight handheld musical instruments that provides free movement during on stage performance to control and trigger e.g., lighting scenes, by wirelessly transmitting MIDI to e.g., a MIDI-to-DMX processor (DMX, being the acronym for Digital Multiplex, which is the standard digital communication protocol that is used to remotely control intelligent e.g., stage lighting fixtures) providing the e.g., user to, at the same time the ability to synchronize e.g., a light show, by the tempo of his or a musical group live stage performance] which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A handheld musical instrument comprising:

a main body portion with one or more sensors for detecting tap inputs;

a sensor distribution module comprising a sensor distribution circuitry and one or more of: an analog-to-digital converter, a Musical Instrument Digital Interface (MIDI) sequence loop and drum fill selector, a sound module, a wireless transceiver and an accelerometer;

a handle portion engaged with said main body portion wherein said handle portion includes one or more control buttons, operatively connected to the sensor distribution module and configured to select a type of program to be played by said handheld musical instrument; and a gesture detection module for detecting continuous gestures associated with said handheld musical instrument for synchronization with a live musical performance and converting said gestures to a variable beat-per-minute (BPM) tempo, combining the variable BPM tempo with a constant Musical Instrument Digital Interface (MIDI) clock signal to generate a variable MIDI clock tempo dependent time code to control the tempo of supplementing musical or percussion MIDI sequences derived desired tempo, wherein simultaneously triggering supplementing percussion sounds associated with said program generated by said handheld musical instrument.

2. The handheld musical instrument of claim 1, wherein said MIDI clock tempo dependent time code is transmitted wirelessly to one or more of an external sound module, a drum machine, a computer and a recording device.

3. The handheld musical instrument of claim 1, wherein said gesture comprises at least one of shaking side to side, moving back and forth or twisting, of said handheld musical instrument.

4. The handheld musical instrument of claim 1, wherein said gesture detection module comprises a movement sensor to detect said physical movements.

5. The handheld musical instrument of claim 1, wherein said time code is an alternative digital tempo dependent time code.

6. The handheld musical instrument of claim 1, wherein said program played by said handheld musical instrument is connected wirelessly to a sound system.

7. The handheld musical instrument of claim 1, wherein the handle portion engaged with said main body portion, wherein selecting a type of program comprises selecting at least one of a drum and percussion style program, a Musical Instrument Digital Interface (MIDI) percussion or musical sequence.

8. The handheld musical instrument of claim 1, wherein the handle portion engaged with said main body portion, wherein said handle portion comprises one or more of a volume control button, a LED power on/of light indicator, a preset rotary switch, a finger velocity sensor buttons to control variations with respect to MIDI functions and a display for displaying the selected program.

9. The handheld musical instrument of claim 8 further comprising said finger velocity sensor controlling the variation of a Closed and Open Hi Hat while playing a Hi Hat sequence loop.

10. The handheld musical instrument of claim 1, wherein the main body portion may include a USB In/Out connector port, which can connect to any compatible storage device for loading or saving instrument data for example, without limitations, a computer or SD (Secure Digital) memory card.

11. A method for using a handheld musical instrument, comprising the steps of:

detecting tap inputs from one or more sensors;

providing a sensor distribution module;

providing one or more control buttons, operatively connected to the sensor distribution module;

selecting a type of program to be played by said handheld musical instrument utilizing said one or more control buttons;

detecting, via a gesture detection module, continuous gestures of said handheld musical instrument associated with a live musical performance, and converting said gestures to a variable beat-per-minute (BPM) tempo, combining the variable BPM tempo with a constant Musical Instrument Digital Interface (MIDI) clock signal to generate a variable MIDI clock tempo dependent time code to control the tempo of supplementing musical or percussion MIDI sequences derived desired tempo, wherein simultaneously triggering supplementing percussion sounds associated with said program generated by said handheld musical instrument, and wherein said sensor distribution module comprises a sensor distribution circuitry and one or more of: an analog-to-digital converter, a Musical Instrument Digital Interface (MIDI) sequence loop and drum fill selector, a sound module, a wireless transceiver and an accelerometer.

12. The method of claim 11 wherein the MIDI clock tempo dependent time code is transmitted wirelessly to one or more of an external sound module, a drum machine, a loudspeaker controller, a computer and a recording device.

13. The method of claim 11, wherein the step of detecting gestures comprises detecting at least one of shaking side to side, moving back and forth or twisting, of said handheld musical instrument.

14. The method of claim 11, wherein said gesture detection module comprises a movement sensor to detect said physical movements.

15. The method of claim 11, wherein the gesture detection module enables handheld electronic musical instrument to play live music while simultaneously controlling in real time the tempo of supplementing active MIDI sequences comprising at least one of a hi hat, shakers, ride cymbals and cowbell in synchronization with the live performance.

* * * * *